(12) United States Patent    (10) Patent No.:    US 8,475,248 B2
Farley    (45) Date of Patent:    Jul. 2, 2013

(54) AIR CURTAIN DISCHARGE PROTECTION FOR AN AGRICULTURAL HARVESTER

(75) Inventor: Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 647 days.

(21) Appl. No.: 12/651,548

(22) Filed: Jan. 4, 2010

(65) Prior Publication Data

US 2011/0165922 A1    Jul. 7, 2011

(51) Int. Cl.
*A01F 12/30* (2006.01)
(52) U.S. Cl.
USPC .................. 460/111; 460/112; 56/13.3
(58) Field of Classification Search
USPC .............. 460/8, 100, 111, 112; 56/12.8, 13.3, 56/320.2, DIG. 5, DIG. 8
See application file for complete search history.

(56) References Cited

U.S. PATENT DOCUMENTS

| | | | |
|---|---|---|---|
| 2,826,204 A * | 3/1958 | Miller | 460/8 |
| 3,456,652 A * | 7/1969 | Sietmann et al. | 460/8 |
| 4,412,549 A | 11/1983 | Rowland-Hill | |
| 4,711,253 A | 12/1987 | Anderson | |
| RE32,679 E | 5/1988 | Brooks | |
| 5,120,275 A * | 6/1992 | Zacharias | 460/111 |
| 5,569,081 A | 10/1996 | Baumgarten et al. | |
| 6,085,510 A | 7/2000 | McDonnell | |
| 6,406,368 B1 | 6/2002 | Cruson et al. | |
| 7,306,174 B2 | 12/2007 | Pearson et al. | |
| 7,467,997 B2 | 12/2008 | Niermann et al. | |
| 7,487,024 B2 | 2/2009 | Farley et al. | |
| 2007/0066370 A1 | 3/2007 | Redekop et al. | |
| 2007/0111766 A1 | 5/2007 | Holmen | |

FOREIGN PATENT DOCUMENTS

JP    2001078558 A    3/2001

\* cited by examiner

*Primary Examiner* — Alicia Torres
(74) *Attorney, Agent, or Firm* — Patrick M. Sheldrake

(57) ABSTRACT

A discharge system for an agricultural harvester provides an air curtain that shields straw, chaff and other crop residue from the wind. The system includes a blower adapted for mounting to an agricultural harvester and having an intake side and a discharge side and a plenum fluidly connected to the discharge side of the blower. The plenum is arranged and disposed to distribute air exiting the discharge side of the blower to form an air curtain according to a predetermined profile at a location adjacent discharge that exits a rear door of the agricultural harvester as a windrow.

19 Claims, 5 Drawing Sheets

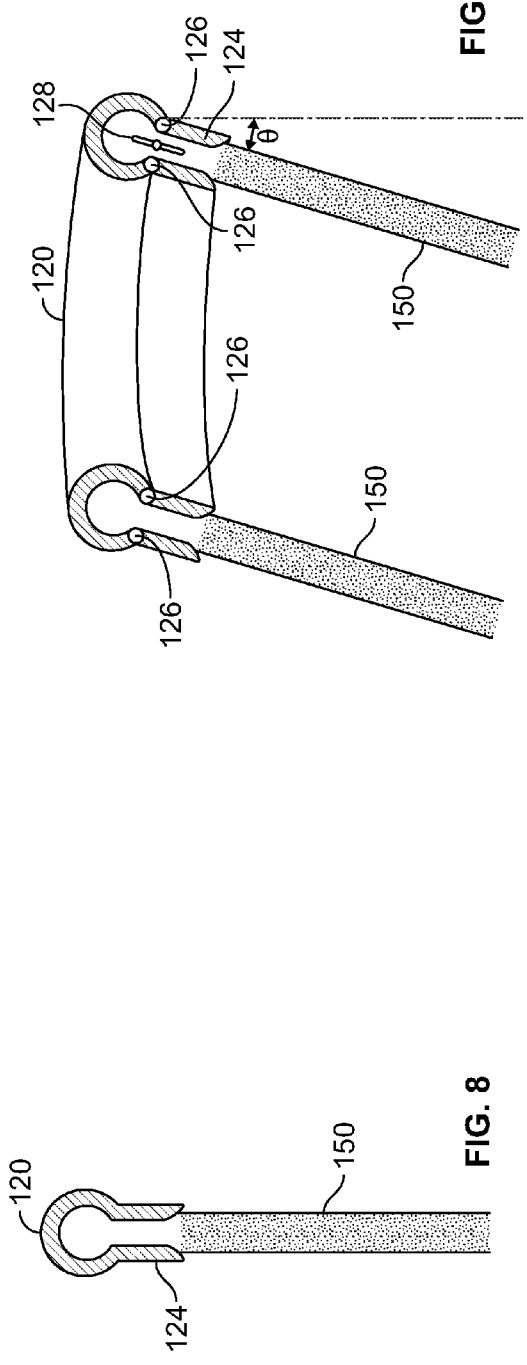
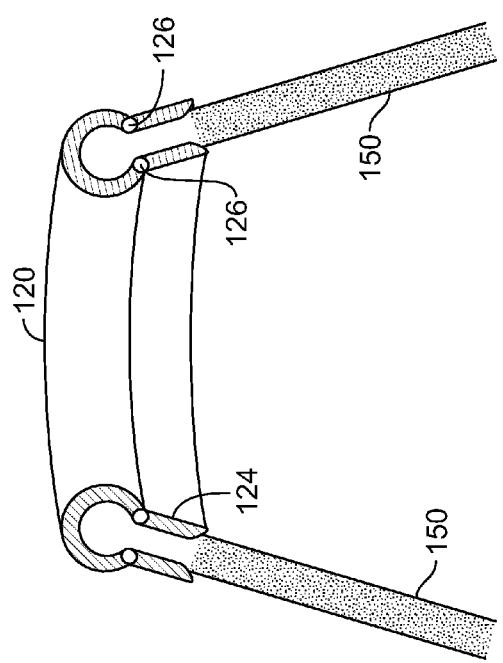
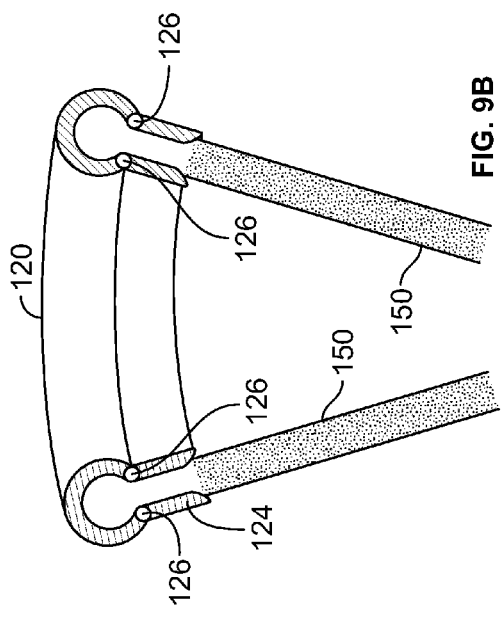

AIR CURTAIN DISCHARGE PROTECTION FOR AN AGRICULTURAL HARVESTER

FIELD OF THE INVENTION

The present invention relates to the improvement of an agricultural harvester. More specifically it relates to an improvement relating to the passage of discharge from the harvester.

BACKGROUND OF THE INVENTION

Agricultural harvesting machines such as combines typically include a spreader for propelling crop residue onto a harvested field. Crop residue may include stalks, leaves and cobs separated from corn or maize; straw and chaff separated from wheat and other grasses; and stalks, leaves and pods of legumes such as soybeans. In many instances it is desirable for the crop residue to be spread as evenly as possible over the entire width of the harvested swath, to avoid problems resulting from uneven spreading, such as, but not limited to, difficulty in passage of fall tillage tools through residue clumps or thick areas; uneven insulation of the field resulting in uneven field warming and thawing and weed or crop emergence during the following planting season; and increased rodent and insect habitat.

In some cases, though, particularly where combines are used to harvest cereal grains, there may be a desire to windrow straw or other discharge for subsequent baling. Windrow discharge from the combine can be stalled or disbursed by strong winds that approach the straw perpendicular to its discharge trajectory. As a result, a secondary operation may be necessary to arrange the straw in a narrow dense formation for processing by a baling machine. In some cases, fine straw and other smaller particles that might otherwise be collected for baling are lost altogether, having been disbursed by the wind and fallen through the stubble and being too fine to be recovered by a secondary operation.

What is needed is a way to preserve and support free windrow formation of discharge exiting the harvester and to reduce scattering of straw and other materials that decreases the ability of that material to be collected for baling.

SUMMARY OF THE INVENTION

The present invention relates to an agricultural harvester discharge system that comprises a blower adapted for mounting to an agricultural harvester and having an intake side and a discharge side and a plenum fluidly connected to the discharge side of the blower. The plenum is arranged and disposed to distribute air exiting the discharge side of the blower to form an air curtain according to a predetermined profile at a location adjacent discharge exiting a rear door of the agricultural harvester as a windrow.

The present invention further relates to an agricultural harvester having such a discharge system.

The present invention yet further relates to a kit containing the blower and plenum of the discharge system as well as instructions how to assemble the discharge system to a harvester.

An advantage of the present invention is that the air curtain provides a shield that protects straw and other discharge exiting the harvester from wind that would otherwise have a tendency to disrupt free windrow formation of the exiting discharge.

A further advantage of the invention is that the use of an air curtain reduces the likelihood of blockage of the discharge path that may occur through the use of a stationary physical barrier.

Yet another advantage of the present invention is that the air curtain can be used to define the width and other characteristics of the window.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8 is a cross-sectional view taken along line 8-8 of the plenum of FIG. 5.

FIG. 9a is a cross-sectional view of an embodiment of the plenum taken along line 9-9 of FIG. 7 configured for an air curtain profile having substantially constant dimensions along its length.

FIG. 9b is a cross-sectional view of an alternate embodiment of the plenum taken along line 9-9 of FIG. 7 configured for an air curtain profile that has a uniform decrease in dimension as the distance from the agricultural harvester to the ground increases.

FIG. 9c is a cross-sectional view of another alternate embodiment of the plenum taken along line 9-9 of FIG. 7 configured for an air curtain profile that has a uniform increase in dimension as the distance from the agricultural harvester to the ground increases.

Wherever possible, the same reference numbers will be used throughout the drawings to refer to the same or like parts.

DETAILED DESCRIPTION OF THE INVENTION

Figure 1:
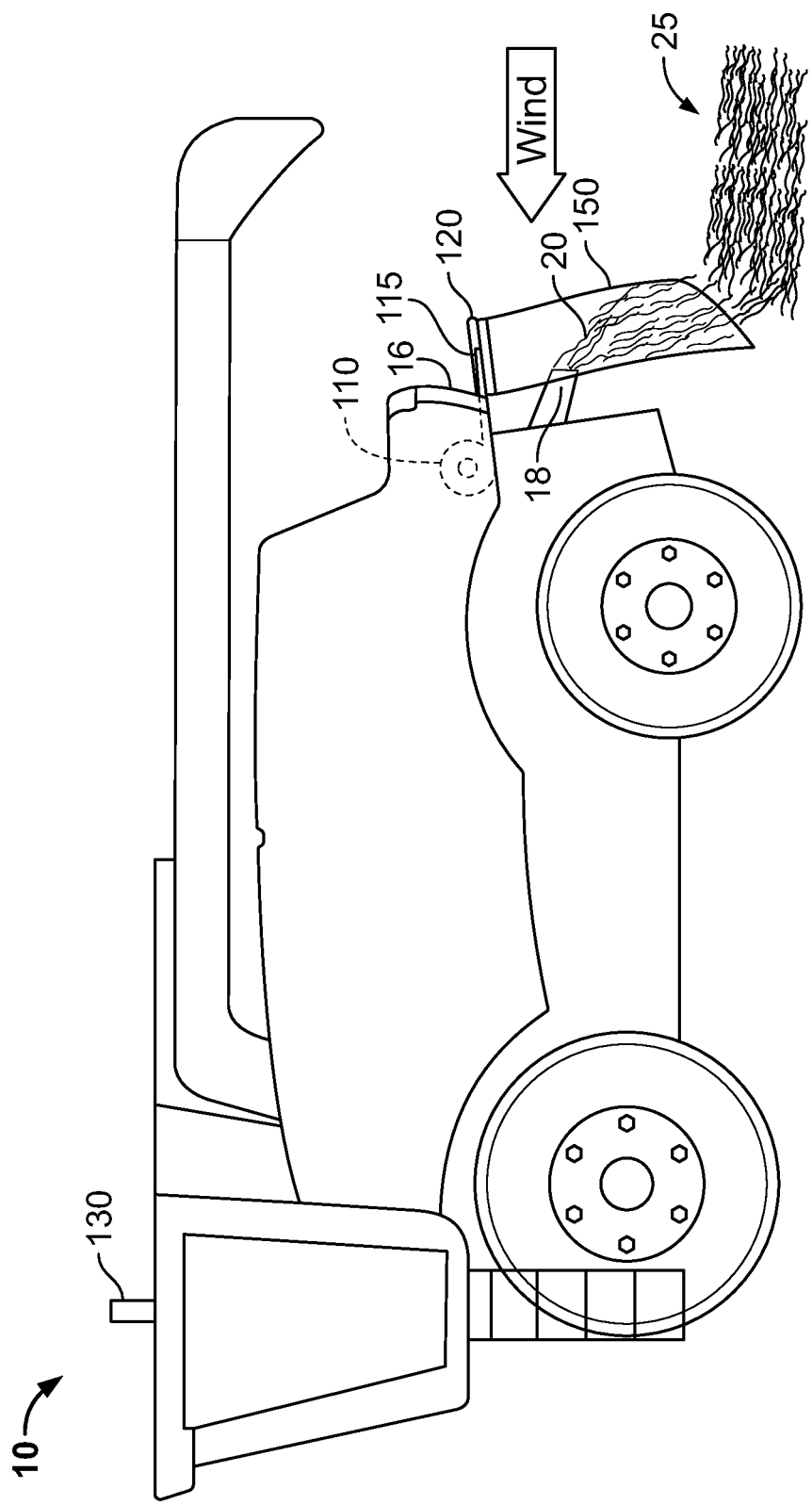
FIG. 1 is side view of a combine harvester in accordance with an exemplary embodiment.
Figure 2:
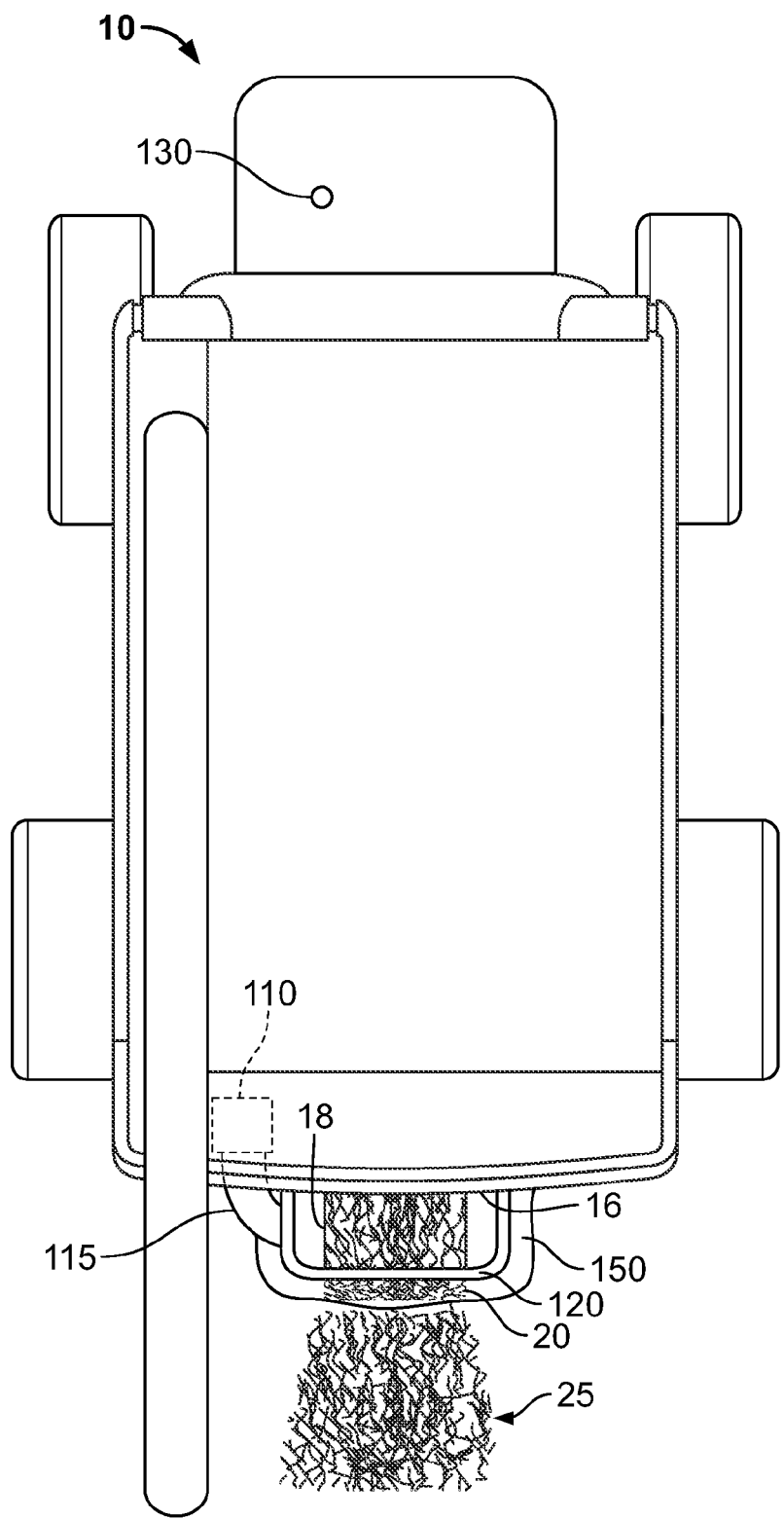
FIG. 2 is top view of a combine harvester in accordance with an exemplary embodiment.
Figure 3:
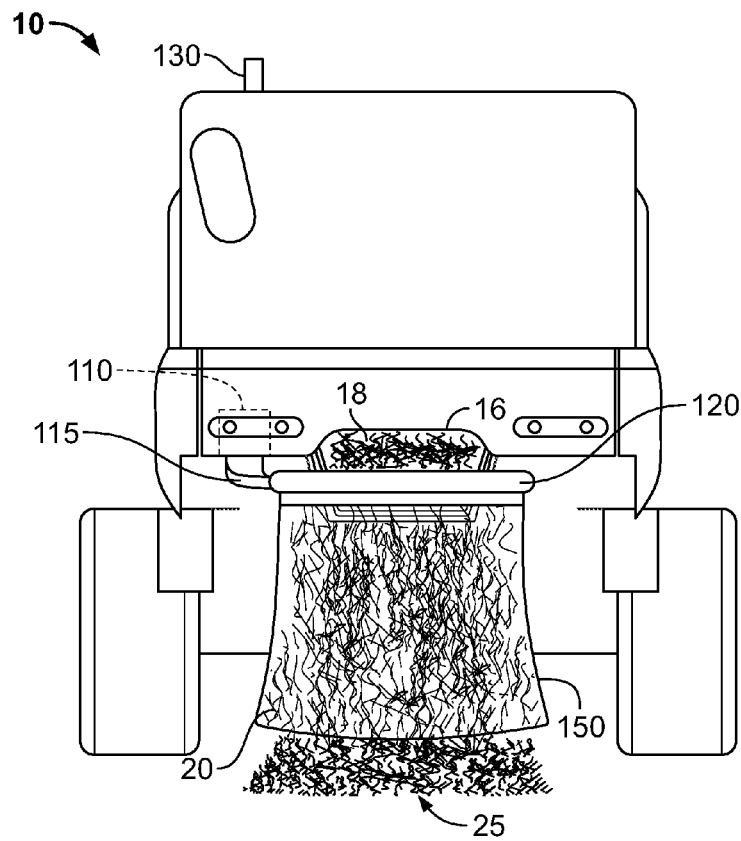
FIG. 3 is a rear view of a combine harvester in accordance with an exemplary embodiment.

FIGS. 1 through 3 illustrate an agricultural harvester 10 in the form of a combine. The combine 10 may include an appropriate header (not shown) which cuts and collects cereal grasses, corn, soybeans or any other plants commonly harvested by combines. The cut, collected plant material is then routed to a thresher within the combine where the grains and seeds are separated from the stalk and any surrounding husk. In the case of cereal grasses, for example, the cereal grains are collected in a hopper in the combine, while the straw, chaff and other residue waste material are expelled from a rear door 16 of the combine 10 as discharge 20.

The discharge 20 may be scattered as it exits the combine 10, typically through the operation of some device designed to disperse the discharge 20 over a wide area. In some cases, particularly in situations where the discharge 20 is to be collected and baled, the discharge 20 may instead exit the combine as a windrow 25, in which the discharge 20 is ejected from the rear door 16 and falls freely to the ground by gravity in which a guide 18 may sometimes be provided at the rear door 16 of the combine to guide the discharge 20 away from the combine 10 during its fall. The ability for free windrow formation can be significantly impacted by wind, particularly tail winds (as illustrated) or side winds for which access to the discharge is largely unobstructed.

According to an embodiment of the invention, the combine 10 is equipped with a discharge system 100 that creates an air curtain 150 that combats wind effects to preserve and support free windrow formation of straw and other discharge exiting the combine. The discharge system 100 includes a blower 110 that is mounted to the combine 10, as well as a plenum 120 that is arranged and disposed to distribute air from the blower at high velocities to form an air curtain 150 that protects the discharge 20. In some embodiments, the velocity of the air exiting the plenum 120 is between about 40 and about 80 mph, although the velocity could fall outside of this range under certain operating conditions, including, for example, the height of the plenum 120 above the ground, the density of the discharge, magnitude of the wind, and other factors.

The air curtain 150 is a thin sheet of air, typically between about 0.25 to about 2 inches wide, more typically about 0.5 to about 1 inch wide, that is directed at a high velocity from the plenum 120 toward the ground. As a result, the air curtain 150 acts as a barrier that shields wind to lessen its effect on the discharge 20 as it falls from the rear door 16 to the ground. The presence of a stationary physical barrier could introduce resistance forces that could slow the movement of discharge 20 as it exits the combine 10, which could, in turn, lead to internal blockages within, and eventual failure of, the combine 10. The air curtain 150 overcomes such concerns, as straw or other discharge 20 that may come into contact with the air curtain 150 is forced away from the combine 10 and toward the ground by the downward motion of the air.

Figure 4:
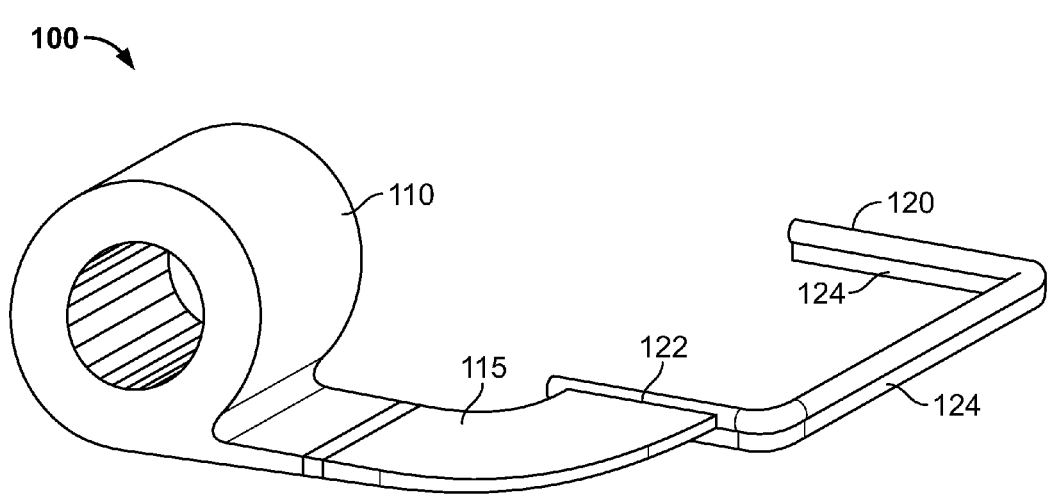
FIG. 4 is a perspective view of an air curtain discharge system in accordance with an exemplary embodiment.

As better seen in the perspective view of the discharge system 100 shown in FIG. 4, the blower 110 can be any suitable fan, compressor or other device for drawing air through an intake and discharging it at a higher velocity. It will be appreciated that the capacity of the particular blower needed in terms of total cubic feet per minute in a particular circumstance may depend on several factors including the length of any ducting 115 from the blower 110 to the plenum 120, the desired velocity of the air in the air curtain 150 to be formed, and the volume of the air curtain 150 desired to be achieved, which is a function of the thickness and area of the air curtain 150. In some cases, it may be desirable to employ multiple blowers 110 connected to a single plenum 120 to increase the total volume of air passing to the plenum 120 and/or to more evenly distribute the air through the plenum to obtain a more uniform velocity profile in the air curtain 150.

The blower 110 may be a variable speed blower so that the velocity of the air in the air curtain 150 can be adjustably increased or decreased depending on wind speed to avoid committing unnecessary horsepower from the combine's engine to power the blower 150 in low wind conditions when a lesser velocity in the air curtain 150 could still provide the shielding effect sought to be achieved. In one embodiment, the blower 110 may be coupled to be in electronic communication with a wind speed sensor 130 which are sometimes mounted to combines and other agricultural equipment. The wind speed sensor 130 (FIGS. 1-3) can be used to automatically adjust blower speed to account for detected changes in wind speed.

The plenum 120 is fluidly connected to the blower 110, either directly or through ductwork 115, to carry the air from the blower 110 to an inlet 122 of the plenum 120. The plenum 120 is a chamber having a narrow outlet 124 and is configured in an arrangement to form the air curtain 150 according to a predetermined profile. The plenum 120 is typically constructed as a molded plastic part, but may be constructed of any other suitable material, such as metal or fiberglass, for example. The plenum 120 may be attached directly to the combine 10, such as by affixing it to the rear door 16, or it may be attached indirectly, for example, being supported by the ducting 115 extending from the blower 110 to the plenum inlet 122. In either case, the plenum 120 is near the rear door 16 such that the air curtain 150 formed by the plenum 120 is adjacent the discharge 20 leaving the rear door 16 of the combine 10.

The air curtain 150 may be formed as to be substantially perpendicular to the ground or it may be angled downwardly away from the rear door. In some embodiments, the plenum 120 may be configured to form an air curtain having a profile that is substantially planar, while in other embodiments, the air curtain may have a profile that partially surrounds the discharge to form an open channel. In still other embodiments, the plenum forms a complete perimeter to form an air curtain that has a profile corresponding to a closed channel that fully surrounds the sides of the discharge 20. In embodiments in which the air curtain forms an open or closed channel, the dimensions of the channel may be constant along the length of the air curtain. Alternatively, the plenum 120 may be configured so that at least one dimension of the air curtain changes in a uniform manner along its length.

Figure 5:
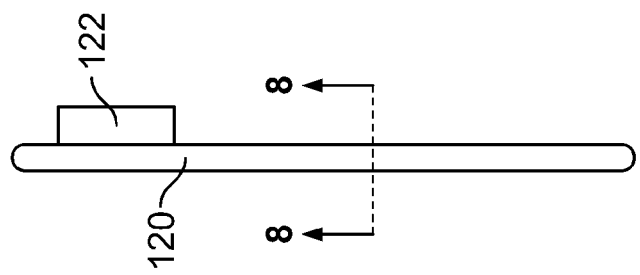
FIG. 5 is a top view of a linear plenum for use with an agricultural harvester discharge system in accordance with an exemplary embodiment.

Turning to FIG. 5, a top view of an elongated, linear plenum 120 configured to form an air curtain 150 having a planar profile is shown. As seen in the cross-sectional view shown in FIG. 8, the plenum 120 has an outlet 124 positioned to form an air curtain perpendicular to the ground, although the plenum 120 could be slightly rotated and/or the outlet 124 configured to direct the air curtain away from the rear door of the combine at an angle.

Figure 6:
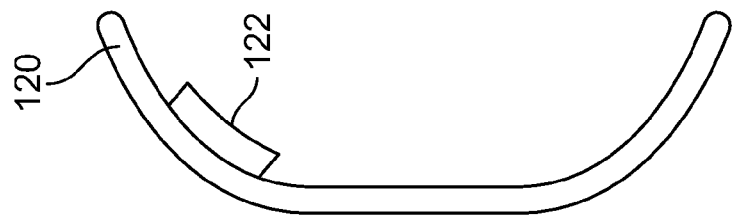
FIG. 6 is a top view of a plenum arranged and disposed to form an air curtain having a profile that partially surrounds adjacent combine discharge in accordance with an exemplary embodiment.

FIG. 6 illustrates a top view of the partial perimeter plenum 120 shown in FIGS. 1 through 4, configured to form an air curtain that partially surrounds the discharge to form an open channel. In many circumstances, a plenum 120 that forms an air curtain 150 to partially surround the discharge 20 may be desired because it provides a single air curtain 150 that protects from both side and tail winds. The body of the combine 10 may adequately protect the discharge 20 from headwinds.

Figure 7:
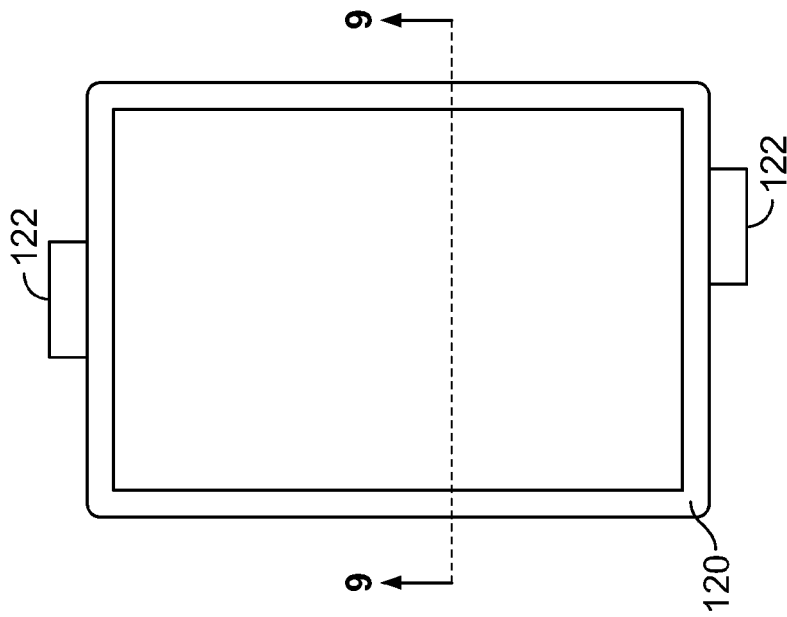
FIG. 7 is a top view of a plenum arranged and disposed to form an air curtain having a profile defining a closed perimeter that surrounds adjacent combine discharge in accordance with an exemplary embodiment.

FIG. 7 illustrates a top view of a plenum 120 that can be used to provide an air curtain that forms a complete perimeter to form a closed channel that fully surrounds the sides of the discharge 20. Although the body of the combine 10 may protect against headwinds even without an air curtain that establishes a full perimeter, the use of an air curtain 150 that forms an enclosed passage for discharge 20 may further be useful to define characteristics of the windrow 25 to be formed.

The cross-sectional view of FIG. 9a illustrates how a full perimeter plenum can be arranged to produce a closed channel having a substantially constant dimension along its length. It further illustrates the manner in which the plenum may be arranged to form an air curtain that extends downwardly away from the rear door (not shown) with respect to a plane perpendicular to the ground, to form an angle θ. In embodiments in which the air curtain is so angled, the angle θ may be any angle up to about 60 degrees. In such cases, the air curtain 150 may extend a length of about six to nine feet from the plenum 120 to the ground.

FIGS. 9b and 9c both illustrate embodiments in which the air curtain 150 forms a channel that has a uniform change in dimensions along its length. In FIG. 9b, the channel has a uniformly decreasing dimension as the distance from the plenum to the ground increases, while in FIG. 9c, the channel has a uniformly increasing dimension along that same distance. In this manner, the passageway formed by the air curtain 150 can be used to define characteristics such as the width and density of windrow formation to further aid in subsequent baling operations. In one embodiment, the air curtain may be used to define a windrow 25 having a width in the range of about three to about four feet.

Although shown as a cross-sectional view of the full perimeter plenum 120 illustrated in FIG. 7, it will be appreciated that the principles described in FIGS. 9a through 9c apply in a similar manner with respect to a partial perimeter plenum 120 as illustrated in FIG. 6.

While any one of FIG. 9a, 9b, or 9c may be molded or otherwise permanently formed to impart a particular profile to the air curtain 150, these Figures further demonstrate that the outlets 124 of the plenum 120 may include a hinge 126 and/or louvers 128 so that the profile of the air curtain 150 can be modified without requiring the plenum 120 to be replaced. For example, the configurations shown in FIGS. 9a, 9b and 9c could each be achieved with the plenum 120 of FIG. 7 by adjusting the plenum outlets 124 using the hinges 126. Likewise, closing or opening one or more louvers 128 can also be used to control the profile of the air curtain 150 by allowing or preventing air to exit the plenum 120 at certain locations along its length.

A discharge system 100 in accordance with exemplary embodiments may be provided as standard or optional equipment on combines and other agricultural harvesters. Alternatively, the discharge system may be provided as an aftermarket add-on kit. Such a kit can include the blower 110 and plenum 120, as well as instructions for mounting the blower 110 to the combine 10 and for fluidly connecting the plenum 120 to the discharge of the blower 110 so that when the kit has been assembled, the plenum 120 is arranged and disposed to form an air curtain 150 adjacent discharge 20 exiting the rear door 16 of the combine 10 as described above.

It will be appreciated that while the plenum 120 has been shown having a uniform cross-section, the invention is not so limited and that depending upon the number of blowers 110 and air curtain 150 to be achieved, a non-uniform plenum 120 may be used in order to obtain uniformity of the air curtain 150. The plenum 120 may further include adjustment devices such as flapper valves (not shown) disposed with the plenum 120 to selectively control the shape and relative velocity of different portions of the air curtain.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural harvester discharge system comprising:
a blower adapted for mounting to an agricultural harvester and having an intake side and a discharge side; and
a plenum fluidly connected to the discharge side of the blower, wherein the plenum is disposed outwardly of a rear door of the agricultural harvester to allow crop discharge to exit the rear door and fall downwardly toward the ground, the plenum distributes air exiting the discharge side of the blower to form a downwardly directed air curtain, such that the direction of the air curtain is substantially perpendicular to the ground, a profile of the air curtain is located adjacent to the crop discharge exiting the rear door in order to protect the crop discharge from at least side and tail winds.

2. The discharge system of claim 1, wherein the air curtain extends downwardly away from the rear door toward the ground at an angle of up to about 60 degrees with respect to a plane perpendicular to the ground.

3. The discharge system of claim 1, wherein the air curtain has a profile that partially surrounds the adjacent crop discharge.

4. The discharge system of claim 3, wherein the air curtain extends from the rear door of the agricultural harvester toward the ground as an open channel having substantially constant dimensions along its length.

5. The discharge system of claim 3, wherein the air curtain extends away from the rear door of the agricultural harvester toward the ground as an open channel that has a change in dimension as the distance from the plenum to the ground increases.

6. The discharge system of claim 1, wherein the air curtain having a profile that surrounds the adjacent crop discharge.

7. The discharge system of claim 6, wherein the air curtain extends from the rear door of the agricultural harvester toward the ground as a closed channel having substantially constant dimensions along its length.

8. The discharge system of claim 6, wherein the air curtain extends from the rear door of the agricultural harvester toward the ground as a closed channel that has a change in dimension as the distance from the plenum to the ground increases.

9. The discharge system of claim 1, wherein the plenum is arranged and disposed to form the air curtain having a width in the range of about one-half inch to about two inches.

10. The discharge system of claim 1, wherein the plenum is arranged and disposed to form the air curtain having a length in the range of about six feet to about nine feet.

11. The discharge system of claim 1, wherein the plenum is arranged and disposed to form the air curtain defining a windrow having a width of less than about four feet.

12. The discharge system of claim, wherein the blower is a variable speed blower.

13. The discharge system of claim 12, further comprising a wind speed sensor in electronic communication with the blower.

14. The discharge system of claim 1, wherein the plenum has a louver for modifying a predetermined profile of the air curtain.

15. The discharge system of claim 1, wherein the plenum has a hinged outlet.

16. An agricultural harvester discharge passage kit comprising:
a blower having an intake side and a discharge side;
a plenum; and
instructions for attaching the blower and plenum to an agricultural harvester, wherein the plenum is disposed outwardly of a rear door of the agricultural harvester to allow crop discharge to exit the rear door and fall downwardly toward the ground, the plenum distributes air exiting the discharge side of the blower to form a downwardly directed air curtain, such that the direction of the air curtain is substantially perpendicular to the ground, a profile of the air curtain is located adjacent the crop discharge exiting the rear door in order to protect the crop discharge from at least side and tail winds.

17. An agricultural harvester comprising:
a rear door for expelling crop discharge in a windrow;
a blower attached to the agricultural harvester and having an intake side and a discharge side; and
a plenum attached adjacent the rear door and being fluidly connected to the discharge side of the blower, the plenum is disposed outwardly of the rear door to allow crop discharge to exit the rear door and fall downwardly toward the around, the plenum distributes air exiting the discharge side of the blower to form a downwardly directed air curtain, such that the direction of the air curtain is substantially perpendicular to the ground, a profile of the air curtain is located adjacent the crop discharge exiting the rear door in order to protect the crop discharge from at least side and tail winds.

18. The harvester of claim 17, wherein the air curtain extends from the rear door of the agricultural harvester toward the ground that has substantially constant dimensions as the distance from the agricultural harvester to the ground increases.

19. The harvester of claim 17, wherein the air curtain extends from the rear door of the agricultural harvester toward the ground that has a change in dimension as the distance from the agricultural harvester to the ground increases.

* * * * *